United States Patent
Sumioka et al.

(10) Patent No.: US 9,343,751 B2
(45) Date of Patent: May 17, 2016

(54) POROUS ELECTRODE SUBSTRATE, METHOD FOR PRODUCING THE SAME, PRECURSOR SHEET, MEMBRANE ELECTRODE ASSEMBLY, AND POLYMER ELECTROLYTE FUEL CELL

(75) Inventors: Kazuhiro Sumioka, Aichi (JP); Yoshihiro Sako, Hiroshima (JP)

(73) Assignee: MITSUBISHI RAYON CO., LTD., Tokyo (JP)

(*) Notice: Subject to any disclaimer, the term of this patent is extended or adjusted under 35 U.S.C. 154(b) by 0 days.

(21) Appl. No.: 13/390,577

(22) PCT Filed: Nov. 22, 2010

(86) PCT No.: PCT/JP2010/070801
§ 371 (c)(1),
(2), (4) Date: Feb. 15, 2012

(87) PCT Pub. No.: WO2011/065327
PCT Pub. Date: Jun. 3, 2011

(65) Prior Publication Data
US 2012/0141911 A1 Jun. 7, 2012

(30) Foreign Application Priority Data
Nov. 24, 2009 (JP) .............................. 2009-266331

(51) Int. Cl.
*H01M 8/02* (2006.01)
*H01M 8/10* (2016.01)

(52) U.S. Cl.
CPC .......... *H01M 8/0234* (2013.01); *H01M 8/1004* (2013.01); *H01M 2008/1095* (2013.01); *Y02E 60/50* (2013.01); *Y02P 70/56* (2015.11)

(58) Field of Classification Search
None
See application file for complete search history.

(56) References Cited

U.S. PATENT DOCUMENTS 6,713,034 B2   3/2004   Nakamura et al.
7,297,445 B2   11/2007   Nakamura et al.
(Continued)

FOREIGN PATENT DOCUMENTS

JP   63 222078   9/1988
JP   7 29566     1/1995
(Continued)

OTHER PUBLICATIONS

Machine Translation of JP2009129634A.*
(Continued)

*Primary Examiner* — Patrick Ryan
*Assistant Examiner* — Wyatt McConnell
(74) *Attorney, Agent, or Firm* — Oblon, McClelland, Maier & Neustadt, L.L.P.

(57) ABSTRACT

The provision of a porous electrode substrate that has large sheet strength, low production costs, high handling properties, high thickness precision and surface smoothness, and sufficient gas permeability and electrical conductivity. A porous electrode substrate including a three-dimensional entangled structure including short carbon fibers (A) dispersed in a three-dimensional structure, joined together via three-dimensional mesh-like carbon fibers (B). A method for producing a porous electrode substrate, including a step (1) of producing a precursor sheet including short carbon fibers (A), and short carbon fiber precursors (b) and/or fibrillar carbon fiber precursors (b') dispersed in a two-dimensional plane; a step (2) of subjecting the precursor sheet to entanglement treatment; and a step (3) of subjecting this sheet to carbonization treatment at 1000° C. or higher. It is preferable to include a step (4) of subjecting the sheet to hot press forming at lower than 200° C. between step (2) and step 3), and to further include a step (5) of subjecting the sheet after hot press forming to oxidation treatment at 200° C. or higher and lower than 300° C. between step (4) and step (3).

20 Claims, 1 Drawing Sheet

100 μ m

(56) References Cited

U.S. PATENT DOCUMENTS

| | | | |
|---|---|---|---|
| 7,510,626 | B2 | 3/2009 | Hamada et al. |
| 7,959,750 | B2 | 6/2011 | Nishida et al. |
| 2002/0029842 | A1 | 3/2002 | Nishida et al. |
| 2004/0227265 | A1 | 11/2004 | Nishida et al. |
| 2006/0166075 | A1* | 7/2006 | Inoue et al. ............... 429/44 |
| 2007/0166524 | A1 | 7/2007 | Nakamura et al. |
| 2007/0218346 | A1 | 9/2007 | Ji et al. |
| 2008/0038589 | A1 | 2/2008 | Nakamura et al. |
| 2008/0268297 | A1 | 10/2008 | Quayle et al. |
| 2010/0279177 | A1* | 11/2010 | Yang ..................... 429/400 |
| 2011/0226431 | A1 | 9/2011 | Nishida et al. |
| 2011/0294036 | A1 | 12/2011 | Sumioka et al. |

FOREIGN PATENT DOCUMENTS

| | | |
|---|---|---|
| JP | 2002-266217 | 9/2002 |
| JP | 2004-259711 | 9/2004 |
| JP | 2005 273051 | 10/2005 |
| JP | 2005-317240 A | 11/2005 |
| JP | 2006 40886 | 2/2006 |
| JP | 2007 273466 | 10/2007 |
| JP | 2008 503043 | 1/2008 |
| JP | 2009129634 A * | 6/2009 |

OTHER PUBLICATIONS

U.S. Appl. No. 11/723,017, filed Mar. 15, 2007, Nakamura, et al.
U.S. Appl. No. 10/872,519, filed Jun. 22, 2004, Nishida, et al.
U.S. Appl. No. 09/903,680, filed Jul. 13, 2001, Nishida, et al.
U.S. Appl. No. 12/987,777, filed Jan. 10, 2011, Nishida, et al.
U.S. Appl. No. 11/630,368, filed Jun. 29, 2007, Nakamura, et al.
U.S. Appl. No. 13/147,814, filed Aug. 4, 2011, Sumioka, et al.
U.S. Appl. No. 13/379,368, filed Dec. 20, 2011, Sumioka, et al.
U.S. Appl. No. 13/384,729, filed Jan. 18, 2012, Sumioka, et al.
U.S. Appl. No. 13/980,774, filed Jul. 19, 2013, Sumioka, et al.
U.S. Appl. No. 13/882,842, filed May 1, 2013, Sumioka, et al.
U.S. Appl. No. 13/892,561, filed May 13, 2013, Sumioka, et al.
Japanese Office Action issued Sep. 10, 2013, in Japan Patent Application No. 2010-546752.
Combined Chinese Office Action and Search Report issued Apr. 10, 2014 in Patent Application No. 201080018393.9.
Supplemental Search Report issued Aug. 11, 2014, in European Patent application No. 10833173.7.
"Fiber" at p. 436 of Encyclopedia Chimica ("Kagaku dai jiten" in Japanese, issued 1993) w/English translation.
The table at p. 338 of "Industrial Evaluation Method for Fiber" ("Senni Kougyou Shikenhou" in Japanese, issued 1953) w/English translation.
International Search Report Issued Mar. 1, 2011 in PCT/JP10/70801 Filed Nov. 22, 2010.

* cited by examiner

100 μm

50 μm

POROUS ELECTRODE SUBSTRATE, METHOD FOR PRODUCING THE SAME, PRECURSOR SHEET, MEMBRANE ELECTRODE ASSEMBLY, AND POLYMER ELECTROLYTE FUEL CELL

TECHNICAL FIELD

The present invention relates to a porous electrode substrate used for a polymer electrolyte fuel cell using gas and liquid fuels, and a method for producing the same, as well as a membrane electrode assembly and a polymer electrolyte fuel cell using the porous electrode substrate.

BACKGROUND ART

A polymer electrolyte fuel cell is characterized by using a proton conductive polymer electrolyte membrane, and is a device that provides electromotive force by electrochemically reacting a fuel gas, such as hydrogen, with an oxidizing gas, such as oxygen. The polymer electrolyte fuel cell can be utilized as a private power generator, or a power generator for a moving body, such as an automobile.

Such a polymer electrolyte fuel cell has a polymer electrolyte membrane that selectively conducts hydrogen ions (protons). In addition, the fuel cell has two gas diffusion electrodes and has a structure as described below. The gas diffusion electrode has a catalyst layer that contains, as a main component, a carbon powder that supports a noble metal-based catalyst, and has a gas diffusion electrode substrate. Each of the gas diffusion electrodes is joined to the surface of the polymer electrolyte membrane with the catalyst layer facing inward.

An assembly including such a polymer electrolyte membrane and two gas diffusion electrodes is referred to as a membrane electrode assembly (MEA). In addition, on both outer sides of the MEA, separators are installed in which gas flow paths are formed in order to feed a fuel gas and an oxidizing gas and to discharge produced gases and excessive gases.

A gas diffusion electrode substrate needs mechanical strength because the gas diffusion electrode substrate is fastened by a load of several MPa by a separator in order to reduce electric contact resistance and suppress the leakage of a fuel gas or an oxidizing gas fed from the separator to the outside of a fuel cell.

In addition, since the gas diffusion electrode substrate needs to mainly have the following three functions, the gas diffusion electrode substrate is usually a porous electrode substrate having a porous structure. The first function required of the gas diffusion electrode substrate is the function of uniformly feeding the fuel gas or the oxidizing gas from the gas flow path formed in the separator, which is located on the outer side of the gas diffusion electrode substrate, to a noble metal-based catalyst in the catalyst layer. The second function is the function of discharging water produced by a reaction in the catalyst layer. The third function is the function of conducting electrons necessary for the reaction in the catalyst layer or electrons produced by the reaction in the catalyst layer to the separator. Generally, what is considered to be effective in realizing these functions is that the gas diffusion electrode substrate is a carbonaceous material.

Conventionally, in order to increase mechanical strength of the substrate, short carbon fibers were formed to a paper and bound one another by using organic polymers, and then this paper is firing at a high temperature to carbonize the organic polymers and to produce a porous electrode substrate which is composed of carbon/carbon composites in paper shape. However, problems of this technique are that the production process is complicated and production costs are high. In addition, in order to reduce costs, a porous electrode substrate is proposed which is obtained by forming a paper from oxidized short fibers, and then firing the paper at high temperature to carbonize the oxidized short fibers. However, since the oxidized short fibers shrink during firing, problems of the electrode substrate are its dimensional stability and surface precision.

Patent Literature 1 discloses a porous carbon electrode substrate for a fuel cell characterized by having a thickness of 0.05 to 0.5 mm, a bulk density of 0.3 to 0.8 g/cm$^3$, and a bending strength of 10 MPa or more and a deflection in bending of 1.5 mm or more in a three-point bending test under the conditions of a strain rate of 10 mm/min, a distance between support points of 2 cm, and a test piece width of 1 cm.

Patent Literature 2 discloses a carbon fiber sheet having a thickness of 0.15 to 1.0 mm, a bulk density of 0.15 to 0.45 g/cm$^3$, a carbon fiber content of 95% by mass or more, a compressive deformation rate of 10 to 35%, an electric resistance value of 6 mΩ or less, and a degree of drape of 5 to 70 g.

Patent Literature 3 describes a mat that includes a plurality of carbon fibers; and a gas diffusion layer for a fuel cell that is obtained by incorporating a plurality of acrylic pulp fibers into the carbon fiber mat and then by curing and carbonizing them.

CITATION LIST

Patent Literature

Patent Literature 1: International Publication No. WO 2002/042534
Patent Literature 2: International Publication No. WO 2001/056103
Patent Literature 3: JP2007-273466A

SUMMARY OF INVENTION

Technical Problem

However, although the porous carbon electrode substrate disclosed in Patent Literature 1 has high mechanical strength and surface smoothness, and sufficient gas permeability and electrical conductivity, problems thereof are high production costs. Although the method for producing the carbon fiber sheet disclosed in Patent Literature 2 can achieve lower costs, problems thereof are that shrinkage during firing is large, and therefore, the obtained porous electrode substrate includes a large unevenness in the thickness and large undulation. Although the porous electrode substrate disclosed in Patent Literature 3 can achieve lower costs, problems thereof are that there is little tanglement between carbon fibers and acrylic pulp in sheeting, and therefore, handling is difficult. In addition, acrylic pulp has little polymer molecular orientation, compared with fibrous materials, and therefore, the carbonization rate during carbonization is low, and it is necessary to add much acrylic pulp in order to increase handling properties.

It is an object of the present invention to overcome the problems as described above and provide a porous electrode substrate that has low production costs in sheeting, high handling properties, high surface smoothness, sufficient gas permeability and sufficient electrical conductivity, and a method for producing the same.

Solution to Problem

The above problems are solved by the following inventions [1] to [8].

[1] A porous electrode substrate including a three-dimensional entangled structure, wherein short carbon fibers (A) dispersed in a three-dimensional structure are joined together via three-dimensional mesh-like carbon fibers (B).

[2] A porous electrode substrate precursor sheet including a three-dimensional entangled, substantially binder free structure, wherein a mixture of short carbon fibers (A), short carbon fiber precursors (b) and/or fibrillar carbon fiber precursors (b') is present.

[3] The porous electrode substrate precursor sheet according to the above [2], wherein a mass ratio of short carbon fibers (A) to short carbon fiber precursors (b) and/or fibrillar carbon fiber precursors (b') is 20:80 to 80:20.

[4] A method for producing a porous electrode substrate, including:
  a step (1) of producing a precursor sheet including short carbon fibers (A), short carbon fiber precursors (b) and/or fibrillar carbon fiber precursors (b') dispersed in a two-dimensional plane;
  a step (2) of subjecting the precursor sheet to entanglement treatment to provide a three-dimensional entangled structure; and
  a step (3) of subjecting the three-dimensional entangled structure precursor sheet to carbonization treatment at a temperature of 1000° C. or higher.

[5] The method for producing a porous electrode substrate, wherein the method includes a step (4) of subjecting the precursor sheet to hot press forming at a temperature lower than 200° C. between step (2) and step (3) according to the above [4].

[6] The method for producing a porous electrode substrate, wherein the method includes a step (5) of subjecting the precursor sheet after hot press forming to oxidation treatment at a temperature of 200° C. or higher and lower than 300° C. between step (4) and step (3) according to the above [5].

[7] A membrane electrode assembly using a porous electrode substrate according to the above [1].

[8] A polymer electrolyte fuel cell using a membrane electrode assembly according to the above [7].

Advantageous Effects of Invention

The present invention can provide a porous electrode substrate that has excellent handling properties and surface smoothness, and sufficient gas permeability and electrical conductivity. In addition, with the method for producing a porous electrode substrate according to the present invention, the above porous electrode substrate can be produced at low costs.

DESCRIPTION OF EMBODIMENTS

Porous Electrode Substrate

Figure 1:
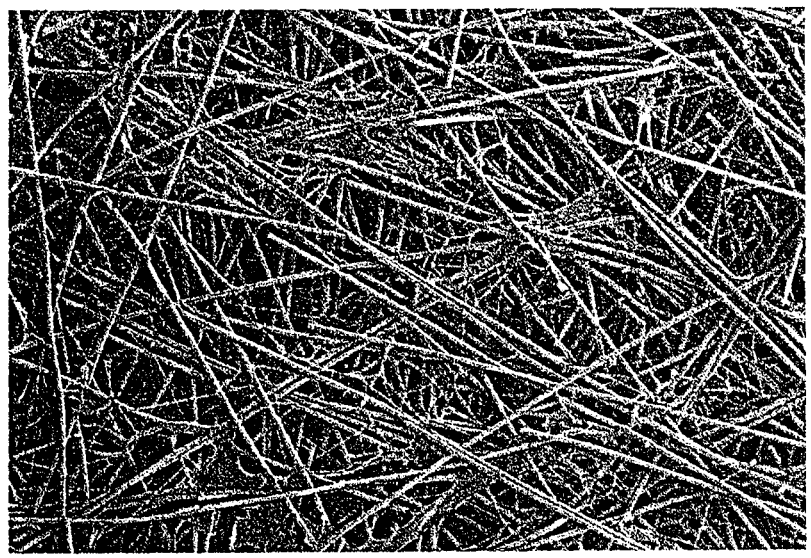
FIG. 1 is a scanning electron micrograph of a surface of the porous electrode substrate of the present invention.
Figure 2:
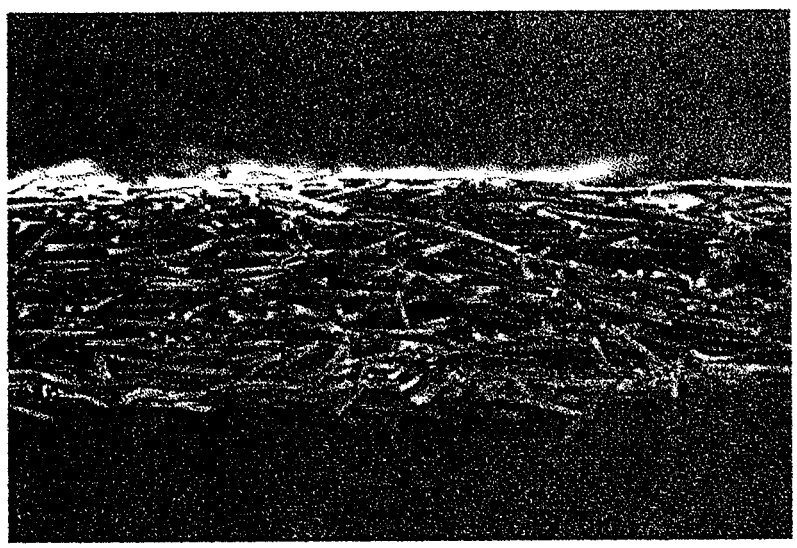
FIG. 2 is a scanning electron micrograph of a cross section of the porous electrode substrate of the present invention.

The porous electrode substrate of the present invention includes a three-dimensional entangled structure including short carbon fibers (A) dispersed in a three-dimensional structure, joined together via three-dimensional mesh-like carbon fibers (B).

The porous electrode substrate can have the shape of a sheet, a spiral or the like. In case of the shape of a sheet, the basis weight of the porous electrode substrate is preferably about 15 to 100 g/m$^2$, the void ratio is preferably about 50 to 90%, the thickness is preferably about 50 to 300 µm, and the undulation is preferably 5 mm or less.

The gas permeability of the porous electrode substrate is preferably 500 to 30000 ml/hr/cm$^2$/mmAq. In addition, the electrical resistance in the thickness direction (through-plane electric resistance) of the porous electrode substrate is preferably 50 mΩ·cm$^2$ or less. Methods for measuring the gas permeability and through-plane electric resistance of the porous electrode substrate will be described later.

<Three-Dimensional Entangled Structure>

The three-dimensional entangled structure in the present invention is a structure in which short carbon fibers (A) constituting the structure are tangled and joined together via three-dimensional mesh-like carbon fibers (B), as described later.

<Short Carbon Fibers (A)>

Examples of short carbon fibers (A) include those obtained by cutting carbon fibers, such as polyacrylonitrile-based carbon fibers (hereinafter referred to as "PAN-based carbon fibers"), pitch-based carbon fibers, and rayon-based carbon fibers, to a suitable length. Taking into consideration the mechanical strength of the porous electrode substrate, PAN-based carbon fibers are preferred. The average fiber length of short carbon fibers (A) is preferably about 2 to 12 mm from the viewpoint of dispersibility.

The average fiber diameter of short carbon fibers (A) is preferably 3 to 9 µm from the viewpoint of dispersibility of short carbon fibers, and is more preferably 4 to 8 µm from the viewpoint of the smoothness of the porous electrode substrate.

<Three-Dimensional Mesh-Like Carbon Fibers (B)>

Three-dimensional mesh-like carbon fibers (B) are fibers that join short carbon fibers (A) together, and are present in a bent state or curved state at joining portions, and each of carbon fibers (B) forms a three-dimensional mesh structure.

The content of three-dimensional mesh-like carbon fibers (B) in the porous electrode substrate is preferably 10 to 90% by mass. In order to maintain sufficient mechanical strength of the porous electrode substrate, the content of three-dimensional mesh-like carbon fibers (B) is more preferably 15 to 80% by mass.

<Method for Producing Porous Electrode Substrate>

A porous electrode substrate of the present invention can be produced, for example, by the following methods.

A first production method is a method of sequentially performing step (1) of producing a precursor sheet X-1 including short carbon fibers (A), and short carbon fiber precursors (b) and/or fibrillar carbon fiber precursors (b') dispersed in a two-dimensional plane, step (2) of subjecting this precursor sheet X-1 to entanglement treatment to provide a precursor sheet X-2 having a three-dimensional entangled structure, and step (3) of subjecting this three-dimensional entangled structure precursor sheet X-2 to carbonization treatment at a temperature of 1000° C. or higher. A porous electrode substrate including a three-dimensional entangled structure that includes short carbon fibers (A) dispersed in a three-dimensional structure and joined together via three-dimensional mesh-like carbon fibers (B), can be obtained by this production method.

A second production method is a method of performing step (4) of subjecting precursor sheet X-2 to hot press forming at a temperature lower than 200° C. to provide a precursor sheet Y between step (2) and step (3) in the above first production method.

A third production method is a method of performing step (5) of subjecting precursor sheet Y to oxidation treatment at a temperature of 200° C. or higher and lower than 300° C. to provide a precursor sheet Z between step (4) and step (3) in the above second production method.

<Short Carbon Fiber Precursors (b)>

Short carbon fiber precursors (b) used in the above production methods are those obtained by cutting long carbon fiber precursors to a suitable length. The fiber length of short carbon fiber precursors (b) is preferably about 2 to 20 mm from the viewpoint of dispersibility. The cross-sectional shape of short carbon fiber precursors (b) is not particularly limited, but those having high roundness are preferred from the viewpoint of mechanical strength after carbonization and production costs. In addition, the diameter of short carbon fiber precursors (b) is preferably 5 µm or less in order to suppress breakage due to shrinkage during carbonization.

For polymers used as such short carbon fiber precursors (b), the residual mass after carbonization treatment step is preferably 20% by mass or more. Examples of such polymers can include acrylic polymers, cellulosic polymers, and phenolic polymers. Taking into consideration spinnability, short carbon fibers (A) that can be joined together at low temperature to high temperature, the residual mass that is large after carbonization treatment, and fiber elasticity and fiber strength in performing entanglement treatment that will be described later, acrylic polymers containing 50% by mass or more of acrylonitrile units are preferably used.

Short carbon fiber precursors (b) may be of one type, or may be of a plurality of types that have different fiber diameters or that are made of different polymer types. The proportion of mesh-like carbon fibers (B) in the finally obtained porous electrode substrate is different depending on the type of short carbon fiber precursors (b) and fibrillar carbon fiber precursors (b') that will be described later, the mixing ratio of short carbon fiber precursors (b) and fibrillar carbon fiber precursors (b') to short carbon fibers (A), and whether or not oxidation treatment at 200° C. or higher and 300° C. or lower is performed. When the porous electrode substrate is 100% by mass, the amount of mesh-like carbon fibers (B) included in the porous electrode substrate is preferably 10 to 90% by mass. In order to make the mechanical strength of the porous electrode substrate sufficient, the amount of mesh-like carbon fibers (B) is more preferably 20% by mass or more and 60% by mass or less.

<Fibrillar Carbon Fiber Precursors (b')>

Examples of fibrillar carbon fiber precursors (b') used in the above production methods include carbon fiber precursors (b'-1) (hereinafter sometimes simply referred to as "fibers (b'-1)") having a structure in which a large number of fibrils having a diameter of several µm or less (for example, 0.1 to 3 µm) branch from a fibrous stem having a diameter of about 0.1 to 10 µm, and short carbon fiber precursors (b'-2) (hereinafter sometimes simply referred to as "fibers (b'-2)") to be fibrillated by beating. By using these fibrillar carbon fiber precursors (b'), short carbon fibers (A) are skillfully tangled with fibrillar carbon fiber precursors (b') in a precursor sheet and it is easy to obtain a precursor sheet which has excellent handling properties and mechanical strength. The freeness of fibrillar carbon fiber precursors (b') is not particularly limited. Generally, when fibrillar fibers having small freeness are used, there is a tendency that the mechanical strength of the precursor sheet will be improved, but the gas permeability of the porous electrode substrate will decrease.

For polymers constituting fibers (b'-1), the residual mass after carbonization treatment step is preferably 20% by mass or more. Examples of such polymers can include acrylic polymers, cellulosic polymers, and phenolic polymers. Taking into consideration spinnability, short carbon fibers (A) that can be joined together at low temperature to high temperature, the residual mass that is large after carbonization treatment, entanglement between fibers (b'-1) and short carbon fibers (A) and sheet strength, acrylic polymers containing 50% by mass or more of acrylonitrile units are preferably used. The method for producing fibers (b'-1) is not particularly limited, but it is preferable to produce fibers (b'-1) by using a jet solidification method in which the control of freeness is easy.

As fibrillar carbon fiber precursors (b'), one type of fibers (b'-1), or one type of those obtained by subjecting fibers (b'-2) to beating treatment may be used, or a plurality of types of these fibers that have different freenesses or different fiber diameters, that are made of different polymer types, or the like may be used in combination.

Fibers (b'-2) are those obtained by beating fibers, which are obtained by cutting long, splittable sea-island composite fibers to a suitable length, by a refiner, a pulper, or the like for fibrillation. Fibers (b'-2) are produced by using two or more types of different polymers that are dissolved in a common solvent and are incompatible, and the residual mass of at least one type of polymer after carbonization treatment step is preferably 20% by mass or more.

Examples of polymers in which the residual mass after carbonization treatment step is 20% by mass or more, among polymers used for the splittable sea-island composite fibers, include acrylic polymers, cellulosic polymers, and phenolic polymers. Among them, acrylic polymers containing 50% by mass or more of acrylonitrile units are preferably used from the viewpoint of spinnability and the residual mass after carbonization treatment step.

Acrylic polymers may be homopolymers of acrylonitrile, or copolymers of acrylonitrile and other monomers. Monomers that are copolymerized with acrylonitrile are not particularly limited as long as they are unsaturated monomers constituting general acrylic fibers. Examples of monomers include acrylates typified by methyl acrylate, ethyl acrylate, isopropyl acrylate, n-butyl acrylate, 2-ethylhexyl acrylate, 2-hydroxyethyl acrylate, hydroxypropyl acrylate, and the like; methacrylates typified by methyl methacrylate, ethyl methacrylate, isopropyl methacrylate, n-butyl methacrylate, isobutyl methacrylate, t-butyl methacrylate, n-hexyl methacrylate, cyclohexyl methacrylate, lauryl methacrylate, 2-hydroxyethyl methacrylate, hydroxypropyl methacrylate, diethylaminoethyl methacrylate, and the like; acrylic acid, methacrylic acid, maleic acid, itaconic acid, acrylamide, N-methylolacrylamide, diacetoneacrylamide, styrene, vinyltoluene, vinyl acetate, vinyl chloride, vinylidene chloride, vinylidene bromide, vinyl fluoride, and vinylidene fluoride.

The weight-average molecular weight of acrylonitrile polymers is not particularly limited, but is preferably 50000 to 1000000. When the weight-average molecular weight is 50000 or more, there is a tendency for the spinnability to improve, and at the same time, the yarn quality of the fibers is good. When the weight-average molecular weight is 1000000 or less, there is a tendency for the polymer concentration that provides the optimum viscosity of the dope to increases, and productivity is improved.

When the above-described acrylonitrile-based polymers are used as the polymer in which the residual mass after carbonization treatment step is 20% by mass or more, among polymers that are used for the splittable sea-island composite fibers, "another polymer" needs to be dissolved in a solvent common to the acrylonitrile-based polymer and needs to be stably present in dope in which both polymers are dissolved by solvents. In other words, when the degree of incompatibility of two polymers is large in dope, inconvenience of the fibers being heterogeneous is caused to occur in the spinning process, fiber breakage during spinning is caused, and therefore, the forming of fibers may be impossible. Therefore, when "the another polymer" that is incompatible with the acrylonitrile-based polymer is dissolved in a solvent common to the acrylonitrile-based polymer, "the another polymer" needs miscibility such that a sea-island structure can be formed in spinning. In addition, in the case of wet spinning, when "the another polymer" is dissolved in water in a solidification tank or in a washing tank, portions of the fibers are lost, which causes problems during production, and therefore, "the another polymer" needs to be poorly soluble in water.

Examples of "the another polymer" that satisfy these requirements include polyvinyl chloride, polyvinylidene chloride, polyvinylidene fluoride, polyvinylpyrrolidone, cellulose acetate, acrylic resins, methacrylic resins, and phenolic resins. Cellulose acetate, acrylic resins, and methacrylic resins are preferred from the viewpoint of the balance of the above-described requirements. "The another polymer" may be one, two or more.

The splittable sea-island composite fibers used as fibers (b'-2) can be produced by a usual wet spinning method. At first, acrylonitrile polymer and "the another polymer" are dissolved in a solvent to prepare dope. Alternatively, dope obtained by dissolving an acrylonitrile polymer in a solvent, and dope obtained by dissolving "the another polymer" in a solvent may be mixed by a static mixer or the like to provide dope for spinning. Dimethylamide, dimethylformamide, dimethyl sulfoxide, or the like can be used as the solvent. The splittable sea-island composite fibers can be obtained by feeding these dopes to a spinning machine to spin yarns from nozzles, subjecting yarns to wet hot drawing, washing, drying, and dry hot drawing.

The cross-sectional shape of fibers (b'-2) is not particularly limited. In order to suppress dispersibility, and breakage due to shrinkage during carbonization, the fineness of fibers (b'-2) is preferably 1 to 10 dtex. The average fiber length of fibers (b'-2) is preferably 1 to 20 mm from the viewpoint of dispersibility after beating.

In fibers (b'-2), debonding at the interface between two or more polymer phases in a single fiber occurs due to beating by mechanical external force, and at least portions of fibers (b'-2) are split and fibrillated. The beating method is not particularly limited. For example, it is possible to fibrillate fibers (b'-2) by a refiner, a pulper, a beater, or the jet of a pressurized water flow (water jet punching).

When fibers (b'-2) are beaten by mechanical external force, the state of fibrillation changes, depending on the beating method and the duration of beating. As a method for evaluating the degree of fibrillation, freeness evaluation (JIS P8121 (Pulp Freeness Test Method: Canadian standard type)) can be used. The freeness of fibers (b'-2) is not particularly limited.

<Precursor Sheet>

In the above first to third production methods for the porous electrode substrate, precursor sheet X-1 can be produced by the following wet method or dry method. The wet method is a method in which short carbon fibers (A), and short carbon fiber precursors (b) and/or fibrillar carbon fiber precursors (b') are dispersed in a liquid medium to form paper. In addition, the dry method is a method in which short carbon fibers (A), and short carbon fiber precursors (b) and/or fibrillar carbon fiber precursors (b') are dispersed in air and allowed to fall and accumulate. For helping short carbon fibers (A) to be opened into single fibers, and preventing the opened single fibers from reconverging, and further for short carbon fibers (A) and short carbon fiber precursors (b) to be tangled with each other to improve sheet strength and be substantially binder free, it is preferable to produce the precursor sheet by the wet method, using fibrillar carbon fiber precursors (b').

Examples of mediums in which short carbon fibers (A), and short carbon fiber precursors (b) and/or fibrillar carbon fiber precursors (b') are dispersed include mediums in which short carbon fiber precursors (b) and/or fibrillar carbon fiber precursors (b') are not dissolved, such as water and alcohols. From the viewpoint of productivity, water is preferred.

In addition, precursor sheet X-1 can be produced either by a continuous method or a batch method. From the viewpoint of productivity and mechanical strength of the precursor sheet, it is preferable to produce a precursor sheet by a continuous method.

The basis weight of precursor sheets X-2, Y, and Z is preferably about 10 to 200 g/m$^2$. In addition, the thickness of precursor sheets X-2, Y, and Z is preferably about 20 to 400 μm.

<Entanglement Treatment>

Entanglement treatment in which short carbon fibers (A) are entangled with short carbon fiber precursors (b) and/or fibrillar carbon fiber precursors (b') in precursor sheet X-1 should be a method in which a three-dimensional entangled structure is formed, and can be performed by publicly known methods. For example, a mechanical entanglement method, such as a needle punching method, a high-pressure liquid jet treatment method, such as a water jet punching method, a high-pressure gas jet treatment method, such as a steam jet punching method, or a method of a combination thereof can be used. The high-pressure liquid jet treatment method is preferred because the breakage of short carbon fibers (A) during entanglement step can be suppressed, and sufficient entanglement properties are obtained.

<High-Pressure Liquid Jet Treatment Method>

The high-pressure liquid jet treatment method is a treatment method in which short carbon fibers (A) are entangled with short carbon fiber precursors (b) and/or fibrillar carbon fiber precursors (b') in the precursor sheet by placing the precursor sheet on a support member that has a substantially smooth surface, and allowing a columnar liquid flow, a fan-shaped liquid flow, a slit liquid flow, or the like jetted at a pressure of 10 kg/cm$^2$ or more to act on the precursor sheet. Here, for a support member that has a substantially smooth surface, any member can be used as long as the pattern on the support member is not formed on the surface of the obtained three-dimensional entangled structure, and the jetted liquid is quickly removed from the surface of the support member. Specific examples thereof can include a 30 to 200 mesh wire net or plastic net, a roll, or the like.

This method is preferred from the viewpoint of productivity because it is possible to produce precursor sheet X-1, and then continuously produce three-dimensional entangled structure precursor sheet X-2 by high-pressure liquid jet treatment, on a support member that has a substantially smooth surface.

The liquid used for the high-pressure liquid jet treatment may be any liquid except for solvents that dissolve the fibers constituting precursor sheet X-1. Usually, water or warm water is preferably used. The hole diameter of each jet nozzle in the high-pressure liquid jet nozzles is preferably in the range of 0.06 to 1.0 mm, more preferably in the range of 0.1 to 0.3 mm, in the case of a columnar flow. The distance between the nozzle jet holes and the laminate is preferably in the range of about 0.5 to 5 cm. The pressure of the liquid is preferably 10 kg/cm² or more, more preferably 15 kg/cm² or more. Entanglement treatment may be performed in one row or a plurality of rows. When entanglement treatment is performed in a plurality of rows, the technique that is effective is to make the pressure in the high-pressure liquid jet treatment higher in the second and subsequent rows than in the first row.

Entanglement treatment of the precursor sheet by high-pressure liquid jet may be repeated a plurality of times. In other words, after high-pressure liquid jet treatment of precursor sheet X-1 is performed, it is possible to further laminate another precursor sheet X-1, and perform high-pressure liquid jet treatment. In addition, it is possible to turn over the three-dimensional entangled structure precursor sheet that was subjected to high-pressure liquid jet treatment on one surface thereof, and perform high-pressure liquid jet treatment on the opposite surface thereof. Further, these operations may be repeated.

When the three-dimensional entangled structure precursor sheet is continuously produced, a striped track pattern, that is derived from the formation of the rough and fine structure of the sheet and that appears in the longitudinal direction of the sheet, can be suppressed by vibrating a high-pressure liquid jet nozzle, which is provided with nozzle holes in one row or a plurality of rows, in the width direction of the sheet. Mechanical strength in the sheet width direction can be exhibited by suppressing this striped track pattern. In addition, when a plurality of high-pressure liquid jet nozzles that are provided with nozzle holes in one row or a plurality of rows, are used, a periodic pattern that appears in the three-dimensional entangled structure precursor sheet can also be suppressed by controlling the number of vibrations and the vibration phase difference of the high-pressure liquid jet nozzles in the width direction of the sheet.

<Carbonization Treatment>

Three-dimensional entangled structure precursor sheet X-2 can be subjected to carbonization treatment as it is, can be subjected to carbonization treatment after hot press forming, or can be subjected to carbonization treatment after hot press forming and followed by oxidation treatment. Production costs can be reduced by subjecting three-dimensional entangled structure precursor sheet X-2 to carbonization treatment as it is. By joining short carbon fibers (A) by melting short carbon fiber precursors (b) and/or fibrillar carbon fiber precursors (b'), and carbonizing short carbon fiber precursors (b) and/or fibrillar carbon fiber precursors (b') to provide three-dimensional mesh-like carbon fibers (B), the mechanical strength and electrical conductivity of the obtained porous electrode substrate can be increased.

Carbonization treatment is preferably performed in an inert gas in order to increase the electrical conductivity of the porous electrode substrate. Carbonization treatment is usually performed at a temperature of 1000° C. or higher. The temperature range of carbonization treatment is preferably 1000 to 3000° C., more preferably 1000 to 2200° C. The duration of carbonization treatment is, for example, about 10 minutes to 1 hour. In addition, it is possible to perform a pretreatment of firing in an inert atmosphere at a temperature of about 300 to 800° C. before carbonization treatment.

When a continuously produced three-dimensional entangled structure precursor sheet is subjected to carbonization treatment, it is preferable to continuously perform carbonization treatment over the entire length of the precursor sheet from the viewpoint of reducing production costs. When the porous electrode substrate is long, handling properties are high, productivity of the porous electrode substrate increases, and the subsequent production of a membrane electrode assembly (MEA) can also be continuously performed. Therefore, production costs of a fuel cell can be reduced. In addition, in order to increase productivity and to reduce production costs of the porous electrode substrate and the fuel cell, it is preferable to continuously roll up the produced porous electrode substrate.

<Hot Press Forming>

From the viewpoint of joining short carbon fibers (A) in the precursor sheet X-2 by melting short carbon fiber precursors (b) and/or fibrillar carbon fiber precursors (b'), reducing the uneven thickness of the porous electrode substrate, further, preventing fluffing of fibers near the sheet surface due to entanglement treatment, and suppressing short circuit current and gas leak in a fuel cell, it is preferable to form precursor sheet X-2 by hot press forming at a temperature lower than 200° C. to provide precursor sheet Y, before carbonization treatment. For hot press forming, any technique can be applied as long as it is a technique that can form the precursor sheet evenly by hot press forming. Examples of the technique include a method of hot pressing the precursor sheet, with a smooth rigid plate placed on both surfaces of the precursor sheet, and a method using a continuous belt press apparatus.

When a continuously produced precursor sheet is formed by hot press forming, a method using a continuous belt press apparatus is preferred. By this method, carbonization treatment can be continuously performed. Examples of the pressing method in the continuous belt press apparatus include a method of applying pressure to a belt with linear pressure by a roll press, and a method of pressing under surface pressure by a hydraulic head press. The latter is preferred since a smoother porous electrode substrate is obtained.

The heating temperature in hot press forming is preferably lower than 200° C., more preferably 120 to 190° C., in order to effectively make the surface of the precursor sheet smooth.

There is no particular restriction that limits the forming pressure. When the content ratio of short carbon fiber precursors (b) and/or fibrillar carbon fiber precursors (b') in precursor sheet X-2 is high, the surface of precursor sheet Y will be easily able to be made smooth even if the forming pressure is low. At this time, if the forming pressure is higher than necessary, the problem of short carbon fibers (A) being broken during hot press forming, the problem of the structure of the porous electrode substrate being too dense, and the like may occur. The forming pressure is preferably about 20 kPa to 10 MPa.

The duration of hot press forming can be, for example, 30 seconds to 10 minutes. When the precursor sheet X-2 is formed by hot press forming, by using two rigid plates or a continuous belt press apparatus, it is preferable to previously apply a release agent to the rigid plates or the belt, or to sandwich mold release papers between the precursor sheet and the rigid plates or the belt, so that short carbon fiber precursors (b) and/or fibrillar carbon fiber precursors (b'), and the like do not adhere to the rigid plates or the belt.

<Oxidation Treatment>

From the viewpoint of skillfully joining short carbon fibers (A) by melting short carbon fiber precursors (b) and/or fibrillar carbon fiber precursors (b'), and improving the carbonization rate of short carbon fiber precursors (b) and/or fibrillar carbon fiber precursors (b'), the precursor sheet Y obtained by hot press forming is preferably subjected to oxidation treatment at a temperature of 200° C. or higher and lower than 300° C. to provide the precursor sheet Z. Oxidation treatment is more preferably performed at a temperature of 240 to 270° C.

Continuous oxidation treatment by pressurization and direct heating using a heating perforated plate, or continuous oxidation treatment by intermittent pressurization and direct heating using a heating roll or the like is preferred from the viewpoint of reducing production costs and being able to join short carbon fibers (A) to short carbon fiber precursors (b) and/or fibrillar carbon fiber precursors (b') by melting.

The duration of oxidation treatment can be, for example, 1 minute to 2 hours. When a continuously produced precursor sheet is subjected to oxidation treatment, it is preferable to continuously perform oxidation treatment over the entire length of the precursor sheet. By this, it is possible to continuously perform carbonization treatment, and it is possible to improve the productivity of the porous electrode substrate, the membrane electrode assembly, and the fuel cell, and to reduce production costs.

<Membrane Electrode Assembly (MEA)>

A porous electrode substrate of the present invention can be suitably used for a membrane electrode assembly. A membrane electrode assembly includes a polymer electrolyte membrane, catalyst layers, and porous carbon electrode substrates. A cathode side catalyst layer composed of a catalyst for an oxidizing gas is provided on one surface of a polymer electrolyte membrane having proton conductivity, and an anode side catalyst layer composed of a catalyst for a fuel gas is provided on the other surface of the polymer electrolyte membrane. A cathode side porous electrode substrate and an anode side porous electrode substrate are provided on the outer side of the respective catalyst layers.

<Polymer Electrolyte Fuel Cell>

In addition, a membrane electrode assembly using the porous electrode substrate of the present invention can be suitably used for a polymer electrolyte fuel cell. The polymer electrolyte fuel cell includes a cathode side separator in which a cathode side gas flow path is formed, and an anode side separator in which an anode side gas flow path is formed, in such a manner that a membrane electrode assembly is interposed between the cathode side separator and the anode side separator. In addition, an oxidizing gas introduction portion and an oxidizing gas discharge portion, and a fuel gas introduction portion and a fuel gas discharge portion are provided in the respective separators.

EXAMPLES

The present invention will be more specifically described below by Examples. Physical property values and the like in Examples were measured by the following methods. "Parts" means "parts by mass."

(1) Gas Permeability

According to JIS P-8117, the time taken for 200 mL of air to pass through a porous electrode substrate was measured using a Gurley densometer, and the gas permeability (ml/hr/cm²/mmAq) was calculated.

(2) Thickness

The thickness of a porous electrode substrate was measured by using a thickness measuring apparatus, a Dial Thickness Gauge (trade name: 7321, manufactured by Mitutoyo Corporation). The size of the gauge head was 10 mm in diameter, and the measurement pressure was set at 1.5 kPa.

(3) Through-Plane Electric Resistance

A porous electrode substrate was sandwiched between gold-plated copper plates and pressurized from above and below the copper plates at 1 MPa, and the resistance value when current was allowed to flow at a current density of 10 mA/cm² was measured. The electric resistance in the thickness direction (through-plane electric resistance) of the porous electrode substrate was obtained from the following formula:

[through-plane electric resistance (mΩ·cm²)]=[a measured resistance value (mΩ)]×[sample area (cm²)]

(4) Average Diameter of Mesh-Like Carbon Fibers (B)

The diameters of mesh-like carbon fibers (B) at any 50 positions were measured from a scanning electron micrograph of a surface of the porous electrode substrate, and their average value was calculated.

(5) Content of Mesh-Like Carbon Fibers (B)

The content of mesh-like carbon fibers (B) was calculated from the basis weight of a obtained porous electrode substrate and the basis weight of short carbon fibers (A) used, by the following formula:

[the content of mesh-like carbon fibers ($B$) (% by mass)]=[{the basis weight of a porous electrode substrate (g/m²)}−{the basis weight of short carbon fibers ($A$) (g/m²)}]÷[the basis weight of a porous electrode substrate (g/m²)]×100

(6) Undulation of Porous Electrode Substrate

The undulation of a porous electrode substrate was calculated from the difference between the maximum value and the minimum value of the height of a porous electrode substrate having a length of 250 mm and a width of 250 mm, when the porous electrode substrate was left at rest on a flat plate.

Example 1

PAN-based carbon fibers having an average fiber diameter of 7 μm and an average fiber length of 3 mm were prepared as short carbon fibers (A). In addition, short acrylic fibers having an average fiber diameter of 4 μm and an average fiber length of 3 mm (trade name: D122, manufactured by MITSUBISHI RAYON CO., LTD.) were prepared as short carbon fiber precursors (b), and splittable acrylic sea-island composite short fibers composed of acrylic polymer and diacetate (cellulose acetate) which were to be fibrillated by beating (manufactured by MITSUBISHI RAYON CO., LTD., trade name: VONNEL M.V.P.-C651, average fiber length: 3 mm) were prepared as fibrillar carbon fiber precursors (b').

A precursor sheet and a three-dimensional entangled structure precursor sheet were continuously produced by the following operations (1) to (7).

(1) Defibration of Short Carbon Fibers (A)

Short carbon fibers (A) were dispersed in water so that the fiber concentration was 1% (10 g/L), and were subjected to defibration treatment through a disk refiner (manufactured by KUMAGAI RIKI KOGYO CO., LTD.) to provide defibrated slurry fibers (SA).

(2) Defibration of Short Carbon Fiber Precursors (b)

Short carbon fiber precursors (b) were dispersed in water so that the fiber concentration was 1% (10 g/L), and were subjected to defibration treatment through a disk refiner (manufactured by KUMAGAI RIKI KOGYO CO., LTD.) to provide defibrated slurry fibers (Sb).

(3) Defibration of Fibrillar Carbon Fiber Precursors (b')

The above splittable acrylic sea-island composite short fibers were dispersed in water so that the fiber concentration was 1% (10 g/L), and were subjected to beating and defibration treatment through a disk refiner (manufactured by KUMAGAI RIKI KOGYO CO., LTD.) to provide defibrated slurry fibers (Sb').

(4) Preparation of Paper-Making Slurry

Defibrated slurry fibers (SA), defibrated slurry fibers (Sb), defibrated slurry fibers (Sb'), and water for dilution were measured so that the mass ratio of short carbon fibers (A), short carbon fiber precursors (b), and fibrillar carbon fiber precursors (b') was 50:30:20 and the concentration of the fibers in a slurry was 1.44 g/L, and they were prepared in a slurry feed tank. Further, polyacrylamide was added to prepare a paper-making slurry having a viscosity of 22 centipoises.

(5) Production of Precursor Sheet

Treatment equipment was used that includes a sheet-shaped material conveying apparatus that includes a net driving portion and a net, in which plain-woven mesh made of a plastic net having a width of 60 cm and a length of 585 cm was connected in a belt shape, and is capable of being continuously rotated; a paper-making slurry feed apparatus having a slurry feed portion width of 48 cm and a fed slurry amount of 30 L/min; and a reduced-pressure dewatering apparatus located under the net.

The above paper-making slurry was fed onto the above plain-woven mesh by a metering pump. The paper-making slurry was widened to a predetermined size through a flow box for adjusting the slurry into a uniform flow, and fed. The fed slurry was allowed to remain on the plain-woven mesh for 30 seconds. Then, this slurry was dewatered by the reduced-pressure dewatering apparatus, while being passed through a natural dewatering portion, to obtain a wet paper web having a target basis weight of 40 g/m².

(6) Three-Dimensional Entanglement Treatment of Precursor Sheet

A pressurized water flow jet treatment apparatus including the following three water jet nozzles was located downstream of the above treatment equipment.

nozzle 1: hole diameter φ: 0.15 mm, 501 holes, hole pitch in width direction: 1 mm (1001 holes/a width of 1 m), one row arrangement, effective nozzle width: 500 mm.

nozzle 2: hole diameter φ: 0.15 mm, 501 holes, hole pitch in width direction: 1 mm (1001 holes/a width of 1 m), one row arrangement, effective nozzle width: 500 mm.

nozzle 3: hole diameter φ: 0.15 mm, 1002 holes, hole pitch in width direction: 1.5 mm, three row arrangement, row pitch: 5 mm, effective nozzle width: 500 mm.

The above wet paper web was loaded on the net of the pressurized water flow jet treatment apparatus. Pressures of pressurized water flow jet were set at 2 MPa (nozzle 1), 3 MPa (nozzle 2), and 2 MPa (nozzle 3). The above wet paper web was passed through nozzle-installed portions of the apparatus in the order of nozzle 1, nozzle 2, and nozzle 3 to be subjected to entanglement treatment.

(7) Dry Treatment

The above sheet-shaped material after entanglement treatment was dried at 150° C. for 3 minutes by a pin tenter tester (PT-2A-400 manufactured by TSUJII DYEING MACHINE MANUFACTURING CO., LTD.) to obtain a three-dimensional entangled structure precursor sheet having a basis weight of 38.3 g/m². The dispersed state of short carbon fiber precursors (b) and fibrillar carbon fiber precursors (b') in this three-dimensional entangled structure precursor sheet was good, tangling of both fibers was also good, and handling properties was good.

(8) Hot Press Forming

Next, both surfaces of this precursor sheet were sandwiched between papers coated with a silicone-based mold release agent, and then, the precursor sheet was subjected to hot press forming by a batch press apparatus under the conditions of 180° C. and 3 MPa for 3 minutes.

(9) Carbonization Treatment

Then, this precursor sheet was subjected to carbonization treatment in a batch carbonization furnace in a nitrogen gas atmosphere under the condition of 2000° C. for 1 hour to obtain a porous electrode substrate.

This porous electrode substrate had little in-plane shrinkage during carbonization treatment, a sheet undulation as small as 2 mm or less, good surface smoothness, good gas permeability, good thickness, and good through-plane electric resistance. The content of three-dimensional mesh-like carbon fibers (B) in the porous electrode substrate was 26% by mass.

A scanning electron micrograph of a surface of the porous electrode substrate is shown in FIG. 1. It was proved that short carbon fibers (A) dispersed in the three-dimensional structure were joined together via three-dimensional mesh-like carbon fibers (B). The evaluation results are shown in Table 1.

Example 2

A porous electrode substrate was obtained in the same manner as in Example 1, except that the mass ratio of short carbon fibers (A), short carbon fiber precursors (b), and fibrillar carbon fiber precursors (b') in the paper-making slurry was 50:40:10. The porous electrode substrate had little in-plane shrinkage during carbonization treatment, a sheet undulation as small as 2 mm or less, good surface smoothness, good gas permeability, good thickness, and good through-plane electric resistance. In addition, short carbon fibers (A) dispersed in the three-dimensional structure were joined together via three-dimensional mesh-like carbon fibers (B). The evaluation results are shown in Table 1.

Example 3

A porous electrode substrate was obtained in the same manner as in Example 1, except that the pressurized water flow jet pressure was set at 1 MPa (nozzle 1), 2 MPa (nozzle 2), and 1 MPa (nozzle 3). In the porous electrode substrate, short carbon fibers (A) dispersed in the three-dimensional structure were joined together via three-dimensional mesh-like carbon fibers (B). The evaluation results are shown in Table 1.

Example 4

A porous electrode substrate was obtained in the same manner as in Example 1, except that the pressurized water flow jet pressure was set at 3.5 MPa (nozzle 1), 2.5 MPa (nozzle 2), and 3.5 MPa (nozzle 3). In the porous electrode substrate, short carbon fibers (A) dispersed in the three-dimensional structure were joined together via three-dimensional mesh-like carbon fibers (B). The evaluation results are shown in Table 1.

Examples 5 and 6

Porous electrode substrates were obtained in the same manner as in Example 1, except that the target basis weight after production of the precursor sheet was set at 50 g/m² (Example 5) or 60 g/m² (Example 6). In the porous electrode substrates, short carbon fibers (A) dispersed in the three-dimensional structure were joined together via three-dimensional mesh-like carbon fibers (B). The evaluation results are shown in Table 1.

Example 7

A porous electrode substrate was obtained in the same manner as in Example 1, except that polyacrylonitrile-based pulp fabricated by jet solidification in which a large number of fibrils having a diameter of 3 µm or less branched from fibrous stems was used as fibrillar carbon fiber precursors (b'). In the porous electrode substrate, short carbon fibers (A) dispersed in the three-dimensional structure were joined together via three-dimensional mesh-like carbon fibers (B). The evaluation results are shown in Table 1.

Example 8

A porous electrode substrate was obtained in the same manner as in Example 7, except that three-dimensional entanglement treatment by pressurized water flow jet was repeated twice on the same surface of a precursor sheet. In the porous electrode substrate, short carbon fibers (A) dispersed in the three-dimensional structure were joined together via three-dimensional mesh-like carbon fibers (B). The evaluation results are shown in Table 1.

Example 9

A porous electrode substrate was obtained in the same manner as in Example 7, except that three-dimensional entanglement treatment by pressurized water flow jet was performed on one surface of a precursor sheet, and then, the pressurized water flow jet treatment was performed again on the other surface of the precursor sheet. In the porous electrode substrate, short carbon fibers (A) dispersed in the three-dimensional structure were joined together via three-dimensional mesh-like carbon fibers (B). The evaluation results are shown in Table 1.

Example 10

In this Example, fibrillar carbon fiber precursors (b') were not used. PAN-based carbon fibers having an average fiber diameter of 7 µm and an average fiber length of 3 mm were prepared as short carbon fibers (A). In addition, short acrylic fibers having an average fiber diameter of 4 µm and an average fiber length of 3 mm (trade name: D122, manufactured by MITSUBISHI RAYON CO., LTD.) were prepared as short carbon fiber precursors (b). Further, short polyvinyl alcohol (PVA) fibers having an average fiber length of 3 mm (trade name: VBP105-1, manufactured by KURARAY CO., LTD.) were prepared as organic polymer compound.

At first, 50 parts of short carbon fibers (A) were uniformly dispersed in water and opened into single fibers. Next, 40 parts of short carbon fiber precursors (b) and 10 parts of short PVA fibers were added and all of them were uniformly dispersed. Thereafter, they were manually dispersed in a two-dimensional plane (length: 250 mm, width: 250 mm), by using a standard square sheet machine (trade name: No. 2555, manufactured by KUMAGAI RIKI KOGYO CO., LTD.), according to the JIS P-8209 method, and dried to obtain a precursor sheet having a basis weight of 15 g/m². The dispersed state of short carbon fibers (A) and short carbon fiber precursors (b) was good.

Next, two of the precursor sheets were laminated, then, loaded on the net of the pressurized water flow jet treatment apparatus, subjected to three-dimensional entanglement treatment under conditions similar to those of Example 1, and dried to obtain a precursor sheet having a three-dimensional entangled structure. Besides these conditions, a porous electrode substrate was obtained in the same manner as in Example 1. In the porous electrode substrate, short carbon fibers (A) dispersed in the three-dimensional structure were joined together via three-dimensional mesh-like carbon fibers (B). The evaluation results are shown in Table 1.

Examples 11 to 13

In these Examples, short carbon fiber precursors (b) were not used. In addition, the amounts of short carbon fibers (A) and fibrillar carbon fiber precursors (b') in the paper-making slurry that were used were described in Table 1. Besides these conditions, a porous electrode substrate was obtained in the same manner as in Example 1. In the porous electrode substrates, short carbon fibers (A) dispersed in the three-dimensional structure were joined together via three-dimensional mesh-like carbon fibers (B). The evaluation results are shown in Table 1.

Example 14

A polyacrylonitrile-based pulp in which a large number of fibrils having a diameter of 3 µm or less branched from fibrous stems, fabricated by jet solidification, was used as fibrillar carbon fiber precursors (b'). The target basis weight of the precursor sheet was set at 50 g/m². Besides these conditions, a porous electrode substrate was obtained in the same manner as in Example 11. In the porous electrode substrate, short carbon fibers (A) dispersed in the three-dimensional structure were joined together via three-dimensional mesh-like carbon fibers (B). The evaluation results are shown in Table 1.

Example 15

Before carbonization treatment step, both surfaces of the three-dimensional entangled structure precursor sheet after hot press forming were sandwiched between stainless steel punching plates coated with a silicone-based mold release agent, and then, they were subjected to oxidization treatment by a batch press apparatus under the conditions of 280° C. and 0.5 MPa for 1 minute. Besides these conditions, a porous electrode substrate was obtained in the same manner as in Example 14. In the porous electrode substrate, short carbon fibers (A) dispersed in the three-dimensional structure were joined together via three-dimensional mesh-like carbon fibers (B). The evaluation results are shown in Table 1.

Example 16

A porous electrode substrate was obtained in the same manner as in Example 14, except that hot press forming was not performed. In the porous electrode substrate, short carbon fibers (A) dispersed in the three-dimensional structure were joined together via three-dimensional mesh-like carbon fibers (B). The evaluation results are shown in Table 1.

Example 17

A porous electrode substrate was obtained in the same manner as in Example 11, except that the mass ratio of short carbon fibers (A) and fibrillar carbon fiber precursors (b') in the paper-making slurry was 20:80. The porous electrode substrate had an appearance in which wrinkles were formed due to in-plane shrinkage during carbonization treatment, but had good gas permeability, good thickness, and good through-plane electric resistance.

Example 18

A porous electrode substrate was obtained in the same manner as in Example 11, except that the mass ratio of short carbon fibers (A) and fibrillar carbon fiber precursors (b') in the paper-making slurry was 80:20. The porous electrode substrate had a low content of mesh-like carbon fibers (B), and could not maintain a sheet form when a compressive load at a surface pressure of 2.0 MPa or more was applied, but had good gas permeability, good thickness, and good through-plane electric resistance under low surface pressure.

Example 19

(1) Production of Membrane Electrode Assembly (MEA)

Two of the porous electrode substrates obtained in Example 1 were prepared as porous electrode substrates for a cathode and an anode. In addition, a laminate was prepared in which a catalyst layer (catalyst layer area: 25 cm$^2$, the amount of Pt adhered: 0.3 mg/cm$^2$) composed of catalyst-supporting carbon (catalyst: Pt, the amount of the catalyst supported: 50% by mass) was formed on both surfaces of a perfluorosulfonic acid-based polymer electrolyte membrane (membrane thickness: 30 μm). This laminate was interposed between the porous carbon electrode substrates for a cathode and an anode, and these were joined to obtain a MEA.

(2) Evaluation of Fuel Cell Characteristics of MEA

The above MEA was interposed between two carbon separators having a bellows-like gas flow path to form a polymer electrolyte fuel cell (unit cell).

The fuel cell characteristics were evaluated by measuring the current density-voltage characteristics of this unit cell. A hydrogen gas was used as the fuel gas, and air was used as the oxidizing gas. The temperature of the unit cell was 80° C., the fuel gas utilization rate was 60%, and the oxidizing gas utilization rate was 40%. The humidification of the fuel gas and the oxidizing gas was performed by passing the fuel gas and the oxidizing gas through bubblers at 80° C., respectively. As a result, the cell voltage of the fuel cell at a current density of 0.8 A/cm$^2$ was 0.646 V, and the internal resistance of the cell was 2.5 mΩ, and the fuel cell exhibited good characteristics.

Comparative Example 1

A porous electrode substrate was obtained in the same manner as in Example 7, except that entanglement treatment by pressurized water flow jet was not performed. The porous electrode substrate had little in-plane shrinkage during carbonization treatment, and good gas permeability and good thickness. But, the through-plane electric resistance increased, compared with Example 7, and short carbon fibers (A) dispersed in the two-dimensional plane were joined together via mesh-like carbon fibers (B). The evaluation results are shown in Table 1.

Comparative Example 2

A porous electrode substrate was obtained in the same manner as in Example 1, except that short carbon fibers (A) in the paper-making slurry were not used, and the mass ratio of short carbon fiber precursors (b) and fibrillar carbon fiber precursors (b') was 60:40. The porous electrode substrate had large in-plane shrinkage during carbonization treatment, and could not maintain a sheet form.

Comparative Example 3

A porous electrode substrate was obtained in the same manner as in Example 10, except that fibrillar carbon fiber precursors (b') were not used, and the mass ratio of short carbon fibers (A) and short polyvinyl alcohol (PVA) fiber in the paper-making slurry was 80:20. In the porous electrode substrate, mesh-like carbon fibers (B) were not formed, and the porous electrode substrate could not maintain a sheet form.

TABLE 1

| | Precursor sheet | | | | | | | | Porous electrode substrate | | | | |
|---|---|---|---|---|---|---|---|---|---|---|---|---|---|
| | | | Fibrillar carbon fiber precursors (b') | | | | | | | | | | |
| | Short carbon fibers (A) (parts) | Short carbon fiber precursors (b) (parts) | Carbon fiber precursors (b'-1) in which large number of fibrils branch (parts) | Short carbon fiber precursors (b'-2) to be fibrillated by beating (parts) | Short PVA fibers (parts) | Basis weight of X-2 (g/m$^2$) | Un-dulation of sheet (mm) | Surface smoothness | Basis weight (g/m$^2$) | Content of three-dimensional mesh-like carbon fibers (B) (%) | Thickness (μm) | Gas permeability (ml/hr/cm$^2$/mmAq) | Through-plane electric resistance (mΩ·cm$^2$) |
| Example 1 | 50 | 30 | — | 20 | — | 38 | ≤2 | Good | 26 | 26 | 97 | 25000 | 6 |
| Example 2 | 50 | 40 | — | 10 | — | 37 | ≤2 | Good | 24 | 24 | 86 | 21000 | 5.5 |
| Example 3 | 50 | 30 | — | 20 | — | 37 | ≤2 | Good | 27 | 31 | 104 | 23000 | 6.5 |
| Example 4 | 50 | 30 | — | 20 | — | 33 | ≤2 | Good | 22 | 25 | 85 | 28000 | 4.9 |
| Example 5 | 50 | 30 | — | 20 | — | 49 | ≤2 | Good | 30 | 18 | 121 | 20000 | 6.1 |
| Example 6 | 50 | 30 | — | 20 | — | 60 | ≤2 | Good | 36 | 18 | 151 | 16000 | 7.1 |
| Example 7 | 50 | 30 | 20 | — | — | 42 | ≤2 | Good | 29 | 28 | 113 | 19000 | 7.2 |
| Example 8 | 50 | 30 | 20 | — | — | 41 | ≤2 | Good | 28 | 27 | 117 | 18000 | 7.1 |
| Example 9 | 50 | 30 | 20 | — | — | 41 | ≤2 | Good | 29 | 29 | 112 | 19000 | 7.2 |
| Example 10 | 50 | 40 | — | — | 10 | 30 | ≤2 | Good | 20 | 25 | 83 | 26000 | 6.9 |
| Example 11 | 50 | — | — | 50 | — | 37 | ≤2 | Good | 26 | 27 | 106 | 24000 | 5.9 |
| Example 12 | 30 | — | — | 70 | — | 32 | ≤2 | Good | 16 | 41 | 65 | 15000 | 4.7 |
| Example 13 | 70 | — | — | 30 | — | 32 | ≤2 | Good | 24 | 7 | 93 | 28000 | 6 |
| Example 14 | 50 | — | 50 | — | — | 46 | ≤2 | Good | 33 | 30 | 128 | 15000 | 5.9 |
| Example 15 | 50 | — | 50 | — | — | 46 | ≤2 | Good | 32 | 28 | 117 | 16000 | 5.4 |
| Example 16 | 50 | — | 50 | — | — | 47 | ≤2 | Good | 32 | 27 | 131 | 17000 | 7 |
| Example 17 | 20 | — | — | 80 | — | 41 | — | — | 24 | 66 | 82 | 13000 | 4.3 |

TABLE 1-continued

| | Precursor sheet | | | | | | | | Porous electrode substrate | | | | |
|---|---|---|---|---|---|---|---|---|---|---|---|---|---|
| | | Fibrillar carbon fiber precursors (b') | | | | | | | | | | | |
| | | Carbon fiber precursors | Short carbon fiber precursors | | | | | | | | | | |
| | Short carbon fibers (A) (parts) | Short carbon fiber precursors (b) (parts) | (b'-1) in which large number of fibrils branch (parts) | (b'-2) to be fibrillated by beating (parts) | Short PVA fibers (parts) | Basis weight of X-2 (g/m²) | Undulation of sheet (mm) | Surface smoothness — | Basis weight (g/m²) | Content of three-dimensional mesh-like carbon fibers (B) (%) | Thickness (μm) | Gas permeability (ml/hr/cm²/mmAq) | Through-plane electric resistance (mΩ·cm²) |
| Example 18 | 80 | — | — | 20 | — | 40 | — | — | 34 | 4 | 111 | 29000 | 7.8 |
| Comparative Example 1 | 50 | 30 | 20 | — | — | 46 | — | — | 31 | 25 | 121 | 22000 | 9 |
| Comparative Example 2 | — | 60 | — | 40 | — | 38 | — | — | — | — | — | — | — |
| Comparative Example 3 | 80 | — | — | — | 20 | 30 | — | — | — | — | — | — | — |

The invention claimed is:

1. A porous electrode substrate having a three-dimensional entangled structure, the porous electrode substrate comprises short carbon fibers (A) having a length of from 2 to 12 mm dispersed in the three-dimensional structure which are joined together via three-dimensional mesh-like carbon fibers (B), wherein the porous electrode substrate is produced by the method comprising:
(1) producing a precursor sheet X-1 comprising (i) short carbon fibers (A) having a length of from 2 to 12 mm and (ii) at least one fiber selected from the group consisting of short carbon fiber precursors (b) having a length of from 2 to 20 mm and fibrillar carbon fiber precursors (b') dispersed in a two-dimensional plane;
(2) subjecting the precursor sheet X-1 obtained in (1) to entanglement treatment, thereby three-dimensionally orienting the short carbon fibers (A) and providing a three-dimensional entangled porous electrode substrate precursor sheet X-2; and
(3) subjecting the three-dimensional entangled porous electrode substrate precursor sheet X-2 to carbonization treatment at a temperature of 1000° C. or higher, thereby producing the porous electrode substrate,
wherein the entanglement treatment is carried out by at least one method selected from the group consisting of a needle punching method, a water jet punching method, and a stream jet punching method.

2. A porous electrode substrate precursor sheet having a three-dimensional entangled structure, the porous electrode substrate precursor sheet comprising a mixture of (i) short carbon fibers (A) having a length of from 2 to 12 mm and (ii) at least one fiber selected from the group consisting of short carbon fiber precursors (b) having a length of from 2 to 20 mm and fibrillar carbon fiber precursors (b'), wherein the porous electrode substrate precursor sheet is produced by the method comprising:
(1) producing a precursor sheet X-1 comprising (i) short carbon fibers (A) and (ii) at least one fiber selected from the group consisting of short carbon fiber precursors (b) and fibrillar carbon fiber precursors (b') dispersed in a two-dimensional plane; and
(2) subjecting the precursor sheet X-1 obtained in (1) to entanglement treatment, thereby three-dimensionally orienting the short carbon fibers (A) and providing a three-dimensional entangled porous electrode substrate precursor sheet X-2,
wherein the entanglement treatment is carried out by at least one method selected from the group consisting of a needle punching method, a water jet punching method, and a stream jet punching method.

3. The porous electrode substrate precursor sheet according to claim 2, wherein a mass ratio of the short carbon fibers (A) (i) to the at least one fiber (ii) is from 20:80 to 80:20.

4. A method for producing a porous electrode substrate, the method comprising:
(1) producing a precursor sheet comprising (i) short carbon fibers (A) having a length of from 2 to 12 mm and (ii) at least one fiber selected from the group consisting of short carbon fiber precursors (b) having a length of from 2 to 20 mm and fibrillar carbon fiber precursors (b') dispersed in a two-dimensional plane;
(2) subjecting the precursor sheet X-1 obtained in (1) to entanglement treatment, thereby three-dimensionally orienting the short carbon fibers (A) and providing a three-dimensional entangled structure precursor sheet X-2; and
(3) subjecting the three-dimensional entangled structure precursor sheet X-2 to carbonization treatment at a temperature of 1000° C. or higher, thereby producing the porous electrode substrate,
wherein the entanglement treatment is carried out by at least one method selected from the group consisting of a needle punching method, a water jet punching method, and a stream jet punching method.

5. The method according to claim 4 further comprising (4) subjecting the precursor sheet X-2 to hot press forming at a temperature lower than 200° C. between (2) and (3).

6. The method according to claim 5, further comprising (5) subjecting the precursor sheet after hot press forming (4) to oxidation treatment at a temperature of 200° C. or higher and lower than 300° C. between (4) and (3).

7. A membrane electrode assembly comprising a porous electrode substrate according to claim 1.

8. A polymer electrolyte fuel cell comprising a membrane electrode assembly according to claim 7.

9. The porous electrode substrate of claim 1, having a spiral shape, a basis weight of from 15 to 100 g/m², a void ratio of from 50 to 90%, a thickness of from 50 to 300 μm, and undulation of 5 rum or less.

10. The porous electrode substrate of claim 1, wherein a gas permeation of the substrate is from 500 to 30,000 ml/hr/cm²/mmAq.

11. The porous electrode substrate of claim 1, wherein electrical resistance of the substrate in the thickness direction, which is through-plane electrical resistance, is 50 mΩ·cm² or less.

12. The porous electrode substrate of claim 1, wherein an average fiber length of the short carbon fibers (A) is from 2 to 12 mm.

13. The porous electrode substrate of claim 1, wherein a content of the three-directional mesh-like carbon fibers (B) in the porous electrode substrate is from 10 to 90% by mass.

14. The porous electrode substrate of claim 1, wherein a content of the three-directional mesh-like carbon fibers (B) in the porous electrode substrate is from 20 to 60% by mass.

15. The porous electrode substrate precursor sheet of claim 2, comprising the short carbon fiber precursors (b) having a diameter of 5 μm or less and a length of from 2 to 20 mm.

16. The porous electrode substrate precursor sheet of claim 2, wherein the at least one fiber (ii) comprises the short carbon fiber precursors (b) and the fibrillar carbon fiber precursors (b').

17. The porous electrode substrate precursor sheet of claim 2, comprising at least two types of the short carbon fiber precursors (b).

18. The porous electrode substrate precursor sheet of claim 2, comprising at least two type of the fibrillar carbon fiber precursors (b').

19. The porous electrode substrate precursor sheet of claim 2, wherein the short carbon fiber precursors (b') comprise fibers (b'-1) in which fibrils having a diameter of from 0.1 to 3 μm branch from a fibrous stem having a diameter of from 0.1 to 10 μm.

20. The porous electrode substrate precursor sheet of claim 1, wherein an average fiber diameter of the short carbon fibers (A) is from 3 to 9 μm.

* * * * *